United States Patent
Scott et al.

(10) Patent No.: US 11,899,448 B2
(45) Date of Patent: Feb. 13, 2024

(54) AUTONOMOUS VEHICLE THAT IS CONFIGURED TO IDENTIFY A TRAVEL CHARACTERISTIC BASED UPON A GESTURE

(71) Applicant: GM GLOBAL TECHNOLOGY OPERATIONS LLC, Detroit, MI (US)

(72) Inventors: Thomas Scott, San Francisco, CA (US); Peter Ming Gao, San Francisco, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 633 days.

(21) Appl. No.: 16/282,275

(22) Filed: Feb. 21, 2019

(65) Prior Publication Data

US 2020/0272143 A1    Aug. 27, 2020

(51) Int. Cl.
| | | |
|---|---|---|
| *G05D 1/00* | (2006.01) | |
| *G05D 1/02* | (2020.01) | |
| *G06F 3/01* | (2006.01) | |
| *B60W 10/06* | (2006.01) | |
| *B60W 10/08* | (2006.01) | |
| *B60W 10/184* | (2012.01) | |
| *B60W 60/00* | (2020.01) | |
| *G06Q 10/02* | (2012.01) | |
| *G06Q 30/0645* | (2023.01) | |
| *G06Q 50/30* | (2012.01) | |

(52) U.S. Cl.
CPC ......... *G05D 1/0016* (2013.01); *G05D 1/0212* (2013.01); *G05D 1/0276* (2013.01); *G06F 3/017* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 8,942,881 | B2 | 1/2015 | Hobbs et al. | |
| 9,014,905 | B1 * | 4/2015 | Kretzschmar | G05D 1/021 |
| | | | | 701/28 |
| 9,082,239 | B2 * | 7/2015 | Ricci | G06F 3/017 |
| 9,475,422 | B2 * | 10/2016 | Hillis | G06F 3/017 |
| 9,481,366 | B1 * | 11/2016 | Gordon | G05D 1/0088 |
| 9,481,367 | B1 * | 11/2016 | Gordon | B60W 10/20 |

(Continued)

OTHER PUBLICATIONS

Woolf, Susan Eve, "South African Taxi Hand Signs", retrieved from <https://core.ac.uk/download/pdf/39673660.pdf>, retrieval date: Feb. 21, 2019, 368 pages.

*Primary Examiner* — Aniss Chad
*Assistant Examiner* — Madison R Hughes
(74) *Attorney, Agent, or Firm* — Calfee, Halter & Griswold LLP

(57) ABSTRACT

An autonomous vehicle is described herein. The autonomous vehicle is configured to determine that a person is proximate the autonomous vehicle at a location that is external to the autonomous vehicle. The autonomous vehicle is further configured to determine that the person is attempting to hail the autonomous vehicle through use of a gesture. The autonomous vehicle identifies the gesture being performed by the person, and responsive to identifying the gesture, identifies a travel intent that the person is imparting to the autonomous vehicle by way of the gesture. The autonomous vehicle then operates based upon the travel intent.

20 Claims, 6 Drawing Sheets

(56) References Cited

U.S. PATENT DOCUMENTS

| | | | |
|---|---|---|---|
| 9,566,986 B1* | 2/2017 | Gordon | B60W 50/12 |
| 9,718,471 B2* | 8/2017 | Gordon | B60W 30/16 |
| 9,785,145 B2* | 10/2017 | Gordon | B60W 40/04 |
| 9,834,224 B2* | 12/2017 | Gordon | B60W 30/182 |
| 9,855,890 B2* | 1/2018 | James | B60Q 1/525 |
| 9,869,560 B2* | 1/2018 | Gordon | B60W 30/00 |
| 9,880,632 B2* | 1/2018 | Ataee | G06K 9/00335 |
| 9,883,209 B2* | 1/2018 | Ricci | H04N 21/43615 |
| 9,944,291 B2* | 4/2018 | Gordon | B60W 40/04 |
| 9,946,906 B2* | 4/2018 | Ricci | B60L 53/00 |
| 9,952,054 B2* | 4/2018 | An | G08G 1/09675 |
| 9,963,106 B1* | 5/2018 | Ricci | B60W 60/0025 |
| 10,031,523 B2* | 7/2018 | Ricci | G08G 1/096725 |
| 10,054,944 B2* | 8/2018 | Jones | G05D 1/0088 |
| 10,077,007 B2* | 9/2018 | Meyhofer | B60R 11/04 |
| 10,082,877 B2* | 9/2018 | Tokish | B60W 40/10 |
| 10,139,818 B2* | 11/2018 | Tao | G05D 1/0088 |
| 10,146,222 B2* | 12/2018 | Chan | B60W 50/087 |
| 10,152,892 B2* | 12/2018 | Matthiesen | B60Q 1/346 |
| 10,156,848 B1* | 12/2018 | Konrardy | G06F 16/2455 |
| 10,222,798 B1* | 3/2019 | Brady | G05D 1/0225 |
| 10,228,795 B2* | 3/2019 | Dow | G06F 3/017 |
| 10,233,021 B1* | 3/2019 | Brady | G05D 1/0282 |
| 10,241,516 B1* | 3/2019 | Brady | G05D 1/0297 |
| 10,242,514 B2* | 3/2019 | Harish | G05D 1/0011 |
| 10,246,101 B2* | 4/2019 | She | B60W 40/08 |
| 10,248,120 B1* | 4/2019 | Siegel | G05D 1/0223 |
| 10,303,171 B1* | 5/2019 | Brady | G08G 1/207 |
| 10,308,430 B1* | 6/2019 | Brady | G05D 1/0027 |
| 10,310,500 B1* | 6/2019 | Brady | G07C 9/00571 |
| 10,324,463 B1* | 6/2019 | Konrardy | G06Q 40/08 |
| 10,377,375 B2* | 8/2019 | Jones | B60W 30/0956 |
| 10,395,332 B1* | 8/2019 | Konrardy | G06F 16/90335 |
| 10,474,157 B2* | 11/2019 | Yu | B60W 10/18 |
| 10,539,959 B1* | 1/2020 | Silver | G06K 9/00791 |
| 10,580,291 B1* | 3/2020 | Rothenberg | G08G 1/005 |
| 10,611,371 B2* | 4/2020 | Kusano | B60W 60/00274 |
| 10,656,648 B2* | 5/2020 | Suzuki | G05D 1/0088 |
| 10,691,127 B2* | 6/2020 | Kobilarov | G05D 1/0212 |
| 10,710,610 B2* | 7/2020 | Hiramatsu | G05D 1/0088 |
| 10,730,531 B1* | 8/2020 | Phillips | G06N 20/00 |
| 10,766,487 B2* | 9/2020 | Likhachev | G08G 1/166 |
| 10,802,483 B2* | 10/2020 | Gordon | G06T 7/70 |
| 10,843,622 B2* | 11/2020 | Lee | G06K 9/00362 |
| 10,860,020 B2* | 12/2020 | Hummelshoj | G01S 13/862 |
| 10,909,389 B2* | 2/2021 | Sivaraman | G06K 9/00355 |
| 10,913,463 B2* | 2/2021 | Herz | B60K 35/00 |
| 10,928,922 B2* | 2/2021 | Tanimori | G06F 3/017 |
| 11,024,160 B2* | 6/2021 | Ricci | G08G 1/0125 |
| 2012/0173067 A1* | 7/2012 | Szczerba | G06F 3/041 701/1 |
| 2012/0313847 A1* | 12/2012 | Boda | H04M 1/72454 345/156 |
| 2013/0166097 A1* | 6/2013 | Ricci | G06F 11/3065 701/1 |
| 2013/0289858 A1* | 10/2013 | Mangiat | G05D 1/0027 701/117 |
| 2014/0136989 A1* | 5/2014 | Choi | G06F 3/0485 715/752 |
| 2014/0218283 A1* | 8/2014 | Choi | H04N 5/23219 345/156 |
| 2014/0267009 A1* | 9/2014 | DeLean | G06F 3/017 345/156 |
| 2014/0306799 A1* | 10/2014 | Ricci | H04W 4/21 340/5.83 |
| 2014/0306833 A1* | 10/2014 | Ricci | G06F 21/00 340/901 |
| 2014/0306834 A1* | 10/2014 | Ricci | G06Q 30/00 340/902 |
| 2014/0309789 A1* | 10/2014 | Ricci | H04W 4/21 700/276 |
| 2014/0309806 A1* | 10/2014 | Ricci | G06F 21/32 701/1 |
| 2014/0309813 A1* | 10/2014 | Ricci | G06F 21/32 701/2 |
| 2014/0309814 A1* | 10/2014 | Ricci | B60R 25/00 701/2 |
| 2014/0309849 A1* | 10/2014 | Ricci | G01C 21/26 701/33.4 |
| 2014/0309862 A1* | 10/2014 | Ricci | B60W 40/09 701/36 |
| 2014/0309863 A1* | 10/2014 | Ricci | G01C 21/3484 701/36 |
| 2014/0309866 A1* | 10/2014 | Ricci | G06Q 30/0633 701/36 |
| 2014/0309868 A1* | 10/2014 | Ricci | H04W 12/084 701/36 |
| 2014/0309871 A1* | 10/2014 | Ricci | B60R 25/00 701/36 |
| 2014/0309874 A1* | 10/2014 | Ricci | G06Q 30/00 701/36 |
| 2014/0309880 A1* | 10/2014 | Ricci | G06K 9/00335 701/36 |
| 2014/0309927 A1* | 10/2014 | Ricci | G06K 9/00832 701/424 |
| 2014/0310031 A1* | 10/2014 | Ricci | G06Q 30/0265 705/5 |
| 2014/0310103 A1* | 10/2014 | Ricci | H04W 4/40 705/14.62 |
| 2014/0310788 A1* | 10/2014 | Ricci | G06F 21/31 726/6 |
| 2014/0379175 A1* | 12/2014 | Mittermeier | B60R 25/2045 701/2 |
| 2015/0061895 A1* | 3/2015 | Ricci | G06Q 10/20 340/902 |
| 2015/0169074 A1* | 6/2015 | Ataee | G06F 3/015 345/156 |
| 2015/0175172 A1* | 6/2015 | Truong | G10L 25/48 701/36 |
| 2015/0379360 A1* | 12/2015 | Rhee | G06F 3/011 345/633 |
| 2016/0167648 A1* | 6/2016 | James | G06F 3/017 701/28 |
| 2016/0179209 A1* | 6/2016 | Anderson | G06F 3/0481 715/863 |
| 2016/0224123 A1* | 8/2016 | Antoniac | G06F 3/017 |
| 2016/0232364 A1* | 8/2016 | Curtis | G06F 3/017 |
| 2016/0357263 A1* | 12/2016 | Antoniac | G02B 27/017 |
| 2017/0120909 A1* | 5/2017 | Oniwa | B60W 30/12 |
| 2017/0120930 A1* | 5/2017 | Ling | G06F 3/017 |
| 2017/0122754 A1* | 5/2017 | Konishi | B60W 30/18154 |
| 2017/0123492 A1* | 5/2017 | Marggraff | G06F 3/04845 |
| 2017/0129335 A1* | 5/2017 | Lu | A61B 5/6803 |
| 2017/0153714 A1* | 6/2017 | Gao | G06K 9/00805 |
| 2017/0190336 A1* | 7/2017 | Vijayan | B60W 30/18154 |
| 2017/0192437 A1* | 7/2017 | Bier | G05D 1/0016 |
| 2017/0193627 A1* | 7/2017 | Urmson | G01C 21/3617 |
| 2017/0213165 A1* | 7/2017 | Stauffer | G06Q 10/02 |
| 2017/0217445 A1* | 8/2017 | Tzirkel-Hancock | B60W 50/10 |
| 2017/0267256 A1* | 9/2017 | Minster | B60W 50/082 |
| 2017/0329332 A1* | 11/2017 | Pilarski | B60W 30/0956 |
| 2017/0349184 A1* | 12/2017 | Tzirkel-Hancock | B60W 50/08 |
| 2017/0364759 A1* | 12/2017 | Creusot | G06K 9/00805 |
| 2018/0052520 A1* | 2/2018 | Amores Llopis | G06F 3/017 |
| 2018/0203455 A1* | 7/2018 | Cronin | G01C 21/3492 |
| 2018/0374002 A1* | 12/2018 | Li | G06F 3/017 |
| 2019/0011912 A1* | 1/2019 | Lockwood | G05D 1/0231 |
| 2019/0025820 A1* | 1/2019 | Ferguson | G05D 1/0027 |
| 2019/0088148 A1* | 3/2019 | Jacobus | B60W 10/18 |
| 2019/0113351 A1* | 4/2019 | Antony | G01C 21/3664 |
| 2019/0206258 A1* | 7/2019 | Chang | G08G 1/123 |
| 2019/0208049 A1* | 7/2019 | Iagnemma | G05D 1/0088 |
| 2019/0220099 A1* | 7/2019 | Baranski | A61B 5/389 |
| 2019/0263422 A1* | 8/2019 | Enthaler | G06V 40/107 |
| 2020/0042019 A1* | 2/2020 | Marczuk | G08G 1/205 |
| 2020/0049517 A1* | 2/2020 | Sweeney | G05D 1/021 |
| 2020/0062275 A1* | 2/2020 | Higgins | G06K 9/00845 |
| 2020/0064827 A1* | 2/2020 | Miller | G06F 3/017 |

(56) References Cited

U.S. PATENT DOCUMENTS

| | | | |
|---|---|---|---|
| 2020/0065929 A1* | 2/2020 | Mangal | G06V 40/10 |
| 2020/0192394 A1* | 6/2020 | Hammond | G05D 1/0276 |
| 2020/0349666 A1* | 11/2020 | Hodge | G08G 1/017 |

* cited by examiner

AUTONOMOUS VEHICLE THAT IS CONFIGURED TO IDENTIFY A TRAVEL CHARACTERISTIC BASED UPON A GESTURE

BACKGROUND

An autonomous vehicle is a vehicle that is able to operate without a human driver (i.e., without a human driver sitting in the vehicle and controlling the vehicle or without a human controlling the vehicle from a remote location). An exemplary autonomous vehicle includes: 1) several sensor systems of different types; 2) a computing system; and 3) mechanical systems (such as a propulsion system, a braking system, a steering system, etc.). The sensor systems output sensor signals, the computing system receives and processes the sensor signals, and the computing system controls the mechanical systems based upon the sensor signals. Exemplary sensor systems include, but are not limited to, a lidar sensor system, a radar sensor system, an image sensor system (e.g., a video camera), an infrared sensor system, a sonar sensor system, amongst others. With respect to processing the sensor signals, the computing system identifies objects represented in the sensor signals (e.g., pedestrians, bicycles, cars, trucks, traffic barrels, etc.), tracks movement of dynamic objects represented in the sensor signals, predicts future locations of the dynamic objects, and so forth.

It is anticipated that autonomous vehicles will be used in ride-sharing scenarios, where a person can hail the autonomous vehicle and inform the autonomous vehicle as to a desired destination location. In conventional ride-sharing scenarios, the person hails a vehicle through use of a mobile application. More specifically, when the person wishes to hail the vehicle, the person initiates a mobile application on his or her mobile telephone. The mobile application acquires the current location of the telephone from a Global Positioning System (GPS) sensor of the telephone, and transmits the identity of the person, the current location of the telephone, and the desired destination location to a server-side application that is executing on a server computing device. The server-side application identifies a vehicle that is proximate to the current location of the person and transmits an instruction to an operator of the vehicle to pick up the person at the current location of the person and subsequently transport the person to the desired destination location.

Most of the time, this approach for hailing a ride in ride-sharing scenarios is adequate; however, in some situations, requiring use of a mobile application executing on a mobile telephone to hail a ride may be problematic. For instance, when a person is outside in inclement weather, the person may not wish to expose his or her mobile telephone to the environment. Further, a mobile telephone of the person may not have service, may not be able to ascertain its location, may be low on power or have a dead battery, etc. In yet another example, the person may not have a mobile telephone. Further, the person may wish to hail a ride on a whim, such as when the person visually sees a vehicle traveling towards the person along the roadway. In conventional ride-sharing scenarios, this is not possible, as the person must initiate the application on his or her mobile telephone, allow time for the application to acquire the current location of the mobile telephone, and allow further time for the person to provide a desired destination location to the application.

SUMMARY

The following is a brief summary of subject matter that is described in greater detail herein. This summary is not intended to be limiting as to the scope of the claims.

Described herein are various technologies pertaining to autonomous vehicles. More particularly, described herein are technologies relating to determining that a person is hailing an autonomous vehicle through use of a gesture, identifying the gesture from amongst a plurality of potential gestures, and identifying a travel characteristic that the person is communicating to the autonomous vehicle by way of the gesture. For example, the travel characteristic may be a desired destination of the person, a number of people who are going to enter the autonomous vehicle, an indication that the person desires to take a scenic route, an indication that the person desires to avoid a certain area (e.g., downtown of a city, congested traffic areas), etc.

The autonomous vehicle includes a plurality of sensor systems, where the sensor systems can include a lidar sensor system, a radar sensor system, and an image sensor system (e.g., a video camera). The sensor systems generate sensor signals that are indicative of surroundings of the autonomous vehicle. The autonomous vehicle further includes a computing system that processes the sensor signals to identify and track objects in the surroundings of the autonomous vehicle as the autonomous vehicle is traveling along roadways. The computing system can determine, based upon a sensor signal output by a sensor system, that a user may be attempting to hail a ride from the autonomous vehicle. For instance, the computing system can determine, based upon the sensor signal and further based upon a computer-implemented map of a geographic region in which the autonomous vehicle is traveling, that the person has stepped into the roadway or is proximate to the roadway. Further, based upon the sensor signal, the computing system can ascertain that an arm of the user is raised, thereby indicating that the user is attempting to hail the autonomous vehicle.

Responsive to determining that the person may be attempting to hail the autonomous vehicle, the computing system can cause the autonomous vehicle to decrease its velocity, thereby providing additional time for the autonomous vehicle to identify the gesture being performed by the person. Additionally, in an exemplary embodiment, a sensor system in the sensor systems may be an articulated sensor system, and the computing system can transmit a control signal to the sensor system that causes the sensor system to "focus" on a particular region (e.g., the right arm and right hand) of the person. While the velocity of the autonomous vehicle is decreased, the computing system receives the sensor signal(s) and identifies the gesture from amongst a plurality of potential gestures. The computing system can identify the gesture, for example, by detecting a number of fingers extended from the hand of the person, by identifying which fingers of the hand of the person are extended, by identifying that the hand is being waved, by identifying that a finger or set of fingers is being moved, etc.

Responsive to identifying the gesture, the computing system can search a gesture library to identify a travel characteristic that is assigned to the gesture. For instance, the identified gesture may indicate that the user wishes to be transported to a baseball stadium. The computing system can take into consideration various factors when identifying the travel characteristic that is being requested by the user through use of the gesture. For example, the travel characteristic can be mapped to a combination of a gesture and a context, wherein the context can include an identity of the person, a geographic region in which the autonomous vehicle is operating, a time of day, a day of week, a weather condition, etc. In an example, the identified gesture may be mapped to a first destination when the autonomous vehicle is in a first geographic region, while the identified gesture may be mapped to a second destination when the autonomous vehicle is in a second geographic region. In another example, the identified gesture may be mapped to a first destination when a first person performs the gesture, while the identified gesture may be mapped to a second destination when a second person performs the gesture. For instance, a person, through utilization of an application, can indicate that the gesture is to inform an autonomous vehicle that the person wishes to travel to his or her home when the person sets forth the gesture. In such an embodiment, the computing system can ascertain an identity of the person, wherein a combination of the gesture and the identity of the person is mapped to the home address of the person. The computing system of the autonomous vehicle can ascertain the identity of the person through use of facial recognition technologies, based upon a message transmitted from a mobile telephone of the person to the autonomous vehicle, based upon known location of the person as reported by an application on the mobile telephone of the person, and so forth. Additionally, the computing system can probabilistically infer the identity of the person based upon previous, known locations of the person, observed behaviors of the person, etc.

The autonomous vehicle can then operate based upon the identified travel characteristic that has been imparted to the autonomous vehicle from the person by way of the gesture. For instance, the autonomous vehicle can continue to decrease its velocity and can pick up the person. The autonomous vehicle may then transport the person to a destination location indicated by the identified gesture. In another example, the gesture may indicate that three riders are to enter the autonomous vehicle and be taken to a destination location. In such example, the autonomous vehicle can ascertain whether there is sufficient room for the three riders, and if there is insufficient room can output a signal to the person indicating that the autonomous vehicle is unable to pick up three people. For instance, the autonomous vehicle can output an audible message, can project a message, can flash lights, etc., to indicate to the person that there is insufficient room in the autonomous vehicle to pick up three people. In still yet another example, the autonomous vehicle may already have a passenger therein and may be traveling along a particular route. Based upon the gesture, the autonomous vehicle can ascertain that the desired destination of the person (as indicated by way of the gesture) is not along the current route being taken by the autonomous vehicle and is not close to the end of such route. Accordingly, the autonomous vehicle can output a communication to the person to indicate that the autonomous vehicle is not traveling towards the destination desired by the person.

In summary, then, the autonomous vehicle is configured to identify that the person is attempting to hail the autonomous vehicle, is further configured to identify a gesture from amongst a plurality of potential gestures being performed by the person, and is still further configured to identify a travel characteristic of a ride being requested by the person based upon the gesture and optionally further based upon contextual data such as an identity of the person, time of day, weather conditions, geographic location, etc. The autonomous vehicle subsequently operates based upon the identified travel characteristic.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
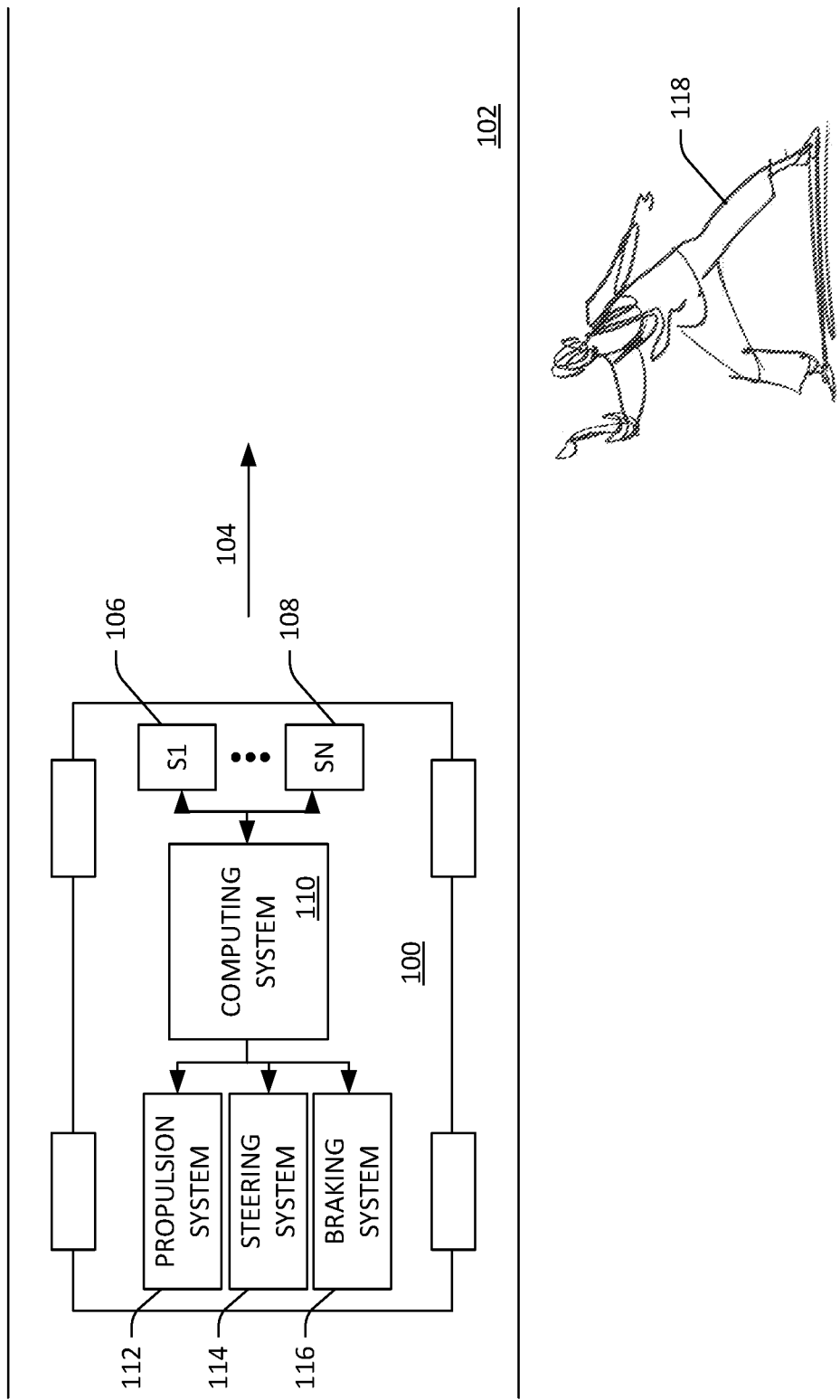
FIG. 1 is a functional block diagram of an exemplary autonomous vehicle that is configured to identify a gesture of a potential passenger of the autonomous vehicle.

Various technologies pertaining to an autonomous vehicle that is configured to ascertain a travel characteristic of a ride being requested by a potential passenger based upon a gesture set forth by the potential passenger are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices. Further, as used herein, the term "exemplary" is intended to mean "serving as an illustration or example of something."

Described herein are various technologies pertaining to autonomous vehicles. With more particularity, an autonomous vehicle described herein is configured to identify, based upon sensor signals output by sensor systems of the autonomous vehicle, that a person is attempting to hail the autonomous vehicle. The autonomous vehicle, responsive to determining that the person is attempting to hail the autonomous vehicle, is further configured to identify a gesture being performed by the person. The autonomous vehicle is additionally configured to identify a travel characteristic being requested by the person through use of the identified gesture. For example, a first gesture may impart to the autonomous vehicle that the person wants to go travel to a first destination location, while a second gesture may impart to the autonomous vehicle that the person wants to travel to a second destination location.

Further, information that is to be imparted to the autonomous vehicle by way of the gesture may be unique to the person, Thus, for instance, the person may pre-define that the gesture is to impart to the autonomous vehicle that the person desires to be taken to a particular destination (e.g., the home of the person). In another example, information that is to be imparted to the autonomous vehicle may be unique to a particular geographic region, such that when the autonomous vehicle is operating in the geographic region, the gesture has a first meaning, while when the autonomous vehicle is operating outside the geographic region, the gesture has a second meaning. Once the autonomous vehicle has determined the meaning of the gesture, the autonomous vehicle can operate based upon this determined meaning. For instance, the autonomous vehicle can compute a route to a destination that is assigned to the gesture and can transport the person to the destination. These and other aspects will be described in more detail below.

With reference now to FIG. 1, an exemplary autonomous vehicle 100 is illustrated. In FIG. 1, the autonomous vehicle 100 is shown as traveling along a roadway 102 in a direction indicated by arrow 104. The autonomous vehicle 100 comprises a plurality of sensor systems 106-108, wherein the sensor systems 106-108 are configured to output sensor signals that are indicative of objects that are external to the autonomous vehicle and in the environment of the autonomous vehicle 100. The sensor systems 106-108 can include, but are not limited to including, a lidar sensor system, a radar sensor system, an image sensor system (e.g., a video camera that outputs video signals), an infrared sensor system, a Global Positioning System (GPS), a sonar sensor system, etc.

The autonomous vehicle 100 additionally includes a computing system 110 that is in communication with the sensor systems 106-108 by way of a suitable connection, Thus, the computing system 110 receives the sensor signals generated by the sensor systems 106-108. In addition, the computing system 110 can transmit control signals to the sensor systems 106-108 to control operation of the sensor systems 106-108. The computing system 110 may include one or more central processing units (CPUs), one or more graphics processing units (CPUs), one or more microcontrollers, one or more microprocessors, one or more application-specific integrated circuits (ASICs), and so forth.

The autonomous vehicle 100 can additionally include a plurality of mechanical systems that control motion of the autonomous vehicle 100. For example, the autonomous vehicle 100 includes a propulsion system 112, which can include a combustion engine, an electric motor, a hybrid system, etc. The mechanical systems of the autonomous vehicle 100 can also include a steering system 114, wherein the steering system 114 is configured to control direction of motion of the autonomous vehicle 100. The mechanical systems may also include a braking system 116 that is configured to decrease the velocity of the autonomous vehicle 100. The computing system 110 controls operation of the propulsion system 112, the steering system 114, and the braking system 116 based upon the sensor signals generated by the sensor systems 106-108.

The computing system 110 is configured to detect, based upon sensor signal(s) generated by the sensor system(s) 106-108, that a person 118 is attempting to hail the autonomous vehicle 100. In addition, based upon such sensor signal(s), the computing system 110 is configured to identify a gesture being performed by the person 118 from amongst a plurality of potential gestures, wherein the potential gestures may have different travel characteristics assigned thereto. For instance, a first gesture may have a first destination location assigned thereto, while a second gesture may have a second destination location assigned thereto. The computing system 110 is configured to identify the gesture being performed by the person 118, infer the intent of the person 118 based upon such gesture, and then control operation of the autonomous vehicle 100 based upon the inferred intent.

Operation of the autonomous vehicle 100 is now described. The autonomous vehicle 100 travels in the direction illustrated by the arrow 104 along the roadway 102. As the autonomous vehicle 100 travels along the roadway 102, the sensor systems 106-108 generate sensor signals that indicate existence of objects in the surroundings of the autonomous vehicle 100. The computing system 110 receives the sensor signals output by the sensor systems 106-108 and detects the person 118 based upon at least one of the sensor signals output by at least one of the sensor systems 106-108. The computing system 110 can then ascertain that the person 118 is potentially hailing the autonomous vehicle 100 for a ride. For example, the computing system 110 can identify a pose of the person 118 through use of skeletal-tracking technologies and can further determine that the pose is consistent with poses set forth by people when hailing rides. For instance, the computing system 110 can identify that a right arm of the person 118 is raised in the air, which is consistent with a pose typically taken by a person who is hailing a ride. The computing system 110 additionally has access to a detailed map of the geographic region and can ascertain that the person 118 is standing in the roadway or very close to the roadway (e.g., on the curb) based upon a sensor signal output by the sensor systems 106-108. Based upon the position of the person 118 relative to the roadway 102, the computing system 110 can determine that the person 118 may be attempting to hail the autonomous vehicle 100. Other examples are contemplated.

Responsive to determining that the person 118 may be attempting to hail the autonomous vehicle 100, the computing system 110 can output control signals to the propulsion system 112, the steering system 114, and/or the braking system 116. For instance, the computing system 110 can output a control signal to the propulsion system 112 that causes the propulsion system 112 to decrease the velocity of the autonomous vehicle 100. Further, the computing system 110 can output a control signal to the steering system 114 to (slightly) modify the direction of travel of the autonomous vehicle 100. For instance, the computing system 110 can cause the steering system 114 to direct the autonomous vehicle 100 towards the person 118, thereby signaling to the person that the autonomous vehicle 100 is intending to pick up the person 118. In another example, the computing system 110 can cause the steering system 114 to alter a sensor system's view of the person 118 (e.g., to allow the sensor system to "look around" an object that would otherwise obstruct the sensor system's view of the person 118). In another example, the computing system 110 can control the braking system 116 such that the velocity of the autonomous vehicle 100 is decreased as the autonomous vehicle 100 approaches the person 118. Decreasing velocity of the autonomous vehicle 100 provides the person with some peace of mind as the autonomous vehicle 100 approaches the person 118, and further provides for some additional time for the computing system 110 to process sensor signals output by the sensor systems 106-108 to ensure that the person 118 is hailing the autonomous vehicle 100 (and not, for example, merely waving to a friend), and further to provide more time for the computing system 110 to identify a gesture being performed by the person 118 from amongst a plurality of potential gestures.

As the autonomous vehicle 100 continues to approach the person 118 along the roadway 102, the computing system 110 may additionally output control signals to one or more of the sensor systems 106-108 to control operation of such sensor systems 106-108. For instance, the first sensor system 106 may be an articulated sensor system, and the computing system 110 can control the first sensor system 106 to "focus" on an arm and/or hand of the person 118. In another example, the Nth sensor system 108 may be a multi-resolution lidar sensor system, where resolution of a sensor signal output by the Nth sensor system 108 can be increased in exchange for decreased sensing depth. Hence, the computing system 110 can transmit a control signal to the Nth sensor system 108 to decrease the sensing depth of the Nth sensor system and increase resolution of the sensor signal output by the Nth sensor system as the autonomous vehicle 100 approaches the person 118. Accordingly, the Nth sensor system can generate a relatively high-resolution point cloud.

The computing system 110, based upon at least one sensor signal output by at least one of the sensor systems 106-108, identifies a gesture being performed by the person 118 from amongst a plurality of potential gestures. The computing system 110 can identify a relatively large number of gestures, wherein a gesture may be the raising of a certain number of fingers in the air, a sequence of fingers being raised in the air, a waving of a hand, an "OK" signal, cupping of a hand, a two-handed gesture, and so forth. In an exemplary embodiment, when the gesture being performed by the person 118 is ambiguous, the computing system 110 can disambiguate between gestures based upon context associated with the gesture, wherein context can include identity of the person 118, time of day, day of week, time of year, geographic location, weather condition, and the like. In an example, when it is midnight and raining outside, the person 118 is more likely to want to go home than to want to go to a golf course. Therefore, when the computing system 110 is identifying the gesture being set forth by the person 118, the computing system 110 can take into consideration that it is midnight and raining when ascertaining whether the gesture being performed by the person 118 is one that requests the autonomous vehicle 100 to take the person 118 to the golf course or another that requests the autonomous vehicle 100 to take the person 118 home. In another example, if the person 118 fairly consistently hails an autonomous vehicle to take the person 118 home at 5:30 p.m., and the autonomous vehicle 100 is able to identify the person 118 as the autonomous vehicle 100 approaches the person 118, then the autonomous vehicle can consider such context when identifying the gesture being performed by the person 118 (e.g., it is more likely that the person 118 is setting forth a gesture for going home than it is that the person 118 is setting forth a gesture to go to work).

Responsive to identifying the gesture, the computing system 110 can identify a travel characteristic that is mapped to the identified gesture. For example, the travel characteristic may be unique to the gesture, such that regardless of context associated with the gesture, the travel characteristic is the same. For instance, a gesture that is associated with an emergency (e.g., the gesture informs the autonomous vehicle 100 to immediately take the person 118 to the hospital) may be uniquely mapped to hospital locations. In other examples, a travel characteristic can be mapped to a combination of a gesture and a context in which the gesture has been made. Thus, a same gesture may be mapped to different travel characteristics assigned thereto in different contexts. For instance, when the person 118 makes the identified gesture in the morning, the gesture can be mapped to a coffee shop as a destination location, while when the person 118 makes the same gesture in the evening, the gesture may be mapped to the location of a pub. In another example, when the autonomous vehicle 100 is in a first geographic region, the gesture being performed by the person 118 may be mapped to the location of a public park, while when the autonomous vehicle 100 is in a second geographic region, the gesture being performed by the person 118 may be mapped to the location of a high school.

Still further, as indicated previously, context can include identify of a person, and therefore the gesture being performed by the person 118 may be mapped to a travel characteristic that is unique to the person 118. For instance, through use of a mobile application, the person 118 can identify several gestures (e.g., from amongst a library of predefined gestures), and may further assign a travel characteristic to each of these gestures. Thus, for instance, the person 118 can indicate that a first gesture is to be mapped to a home address of the person 118 and a second gesture is to be mapped to a work address of the person 118. In such an example, as the autonomous vehicle 100 approaches the person 118, the computing system 110 can be configured to ascertain an identity of the person 118. An exemplary technique for ascertaining the identity of the person 118 is to receive a sensor signal that includes data that is indicative of features of a face of the person 118 and to compare the data with data that is indicative of features of faces of several people. The computing system 110 can identify the person 118 from amongst the several people based upon such comparison (e.g., the computing system 110 can perform facial recognition).

In another example, the person 118 may be carrying a mobile telephone, which has an application corresponding to the autonomous vehicle 100 executing thereon. The application executing on the mobile telephone can monitor a location of the person 118 and can periodically report the location of the person 118 to a server-side application executing on a server computing device that is in network communication with the computing system 110. Thus, as the autonomous vehicle 100 approaches the person 118, the computing system 110 can query the server computing device for identities of people who are proximate the autonomous vehicle 100 and can determine the identity of the person 118 based upon results returned in response to the query. In yet another example, the person 118 may have a mobile telephone that is configured to transmit an identity of the person 118 to the computing system 110 by way of a short-range transmission protocol. Hence, the computing system 110 can receive the identity of the person 118 from the mobile telephone as the autonomous vehicle 100 approaches the person 118. The computing system 110 can thus ascertain that the person 118 is hailing the autonomous vehicle 100, can identify the gesture being performed by the person 118, and can determine an identity of the person 118. Based upon the gesture and the identity of the person 118, the computing system 110 can determine the travel characteristic that is mapped to the combination of the gesture and the identity of the person 118.

There will be some ride-sharing scenarios where the autonomous vehicle 100 will be unable to accommodate a request of the person 118 set forth by way of the gesture. For example, the autonomous vehicle 100 may already have a passenger therein and may be traveling to a destination identified by the passenger. The computing system 110, as described above, can determine that the person 118 is attempting to hail the autonomous vehicle 100 and can ascertain that the person 118 wishes to be taken to a second destination that is relatively far from the destination identified by the current passenger of the autonomous vehicle 100. In such a scenario, the computing system 110 can cause the autonomous vehicle 100 to output a signal to the person 118 that informs the person 118 that the autonomous vehicle 100 is not traveling towards the second destination. For example, the autonomous vehicle 100 may have a projector thereon, and the computing system 110 can control the projector to project text onto the roadway to inform the person 118 that the autonomous vehicle 100 is not traveling towards the second destination. In another example, the autonomous vehicle 100 can include a speaker, and the computing system 110 can cause the speaker to output an audio signal that informs the person 118 that the autonomous vehicle 100 is not traveling towards the second destination. In still yet another example, the computing system 110 can cause a message to be transmitted to a mobile telephone of the person 118 to inform the person 118 that the autonomous vehicle 100 is not traveling towards the second destination. For instance, the computing system 110 can cause a text message to be sent to the mobile telephone of the person 118.

In another exemplary scenario, the autonomous vehicle 100 may already have one or more passengers therein but may have room for the person 118. The computing system 110, as described previously, can ascertain that the person 118 is attempting to hail the autonomous vehicle 100. The computing system 110 may then identify the gesture being performed by the person 118 and can ascertain a travel characteristic that is mapped to the gesture. In this example, the travel characteristic is that three people (including the person 118) need a ride in the autonomous vehicle 100. The autonomous vehicle 100, however, may not have room for all three people, and thus is unable to meet the request of the person 118. Similar to the exemplary scenario set forth above, the autonomous vehicle 100 can communicate to the person 118 that the autonomous vehicle 100 is unable to accommodate the request of the person 118.

The computing system 110 can also be configured to resolve ambiguities in gestures by soliciting feedback from the person 118. For instance, as the autonomous vehicle 100 approaches the person 118, the computing system 110 can ascertain that the person 118 wishes to be taken to a particular location (e.g., the home of the person 118) based upon the gesture identified by the computing system 110. When the person 118 enters the autonomous vehicle 100, the computing system 110 can control a speaker of the autonomous vehicle 100 to output a request for confirming the location, such as: "I think that you want to go home. Is that right?" The person 118 may then set forth input to the computing system 110 to indicate whether or not the computing system 110 correctly identified the gesture being made by the person 118. For example, the autonomous vehicle 100 may include a microphone, and the microphone can capture a verbal response set forth by the person 118, wherein the verbal response indicates whether the computing system 110 correctly identified the gesture. In another example, the autonomous vehicle 100 may have a tablet computing device therein, and the tablet computing device can solicit feedback and receive feedback from the person 118. The feedback back set forth by the person 118 can be used as training data to improve operation of the computing system 110.

Further, people may begin to organically perform gestures that have a certain meaning in particular geographic regions. For example, people in a particular neighborhood in a city may start performing a gesture that was previously not mapped to a travel characteristic. The computing system 110 can determine that the person 118 is hailing the autonomous vehicle 100 but may be unable to ascertain a travel characteristic (as there is no travel characteristic mapped to the gesture). The computing system 110 can solicit feedback from the person 118 as to the travel characteristic that is to be assigned to the gesture. Over time, training data can be collected from the autonomous vehicle 100 (and other autonomous vehicles), which indicates that the gesture, when identified in the neighborhood, is to be mapped to a certain travel characteristic. In other examples, travel characteristics can be mapped to gestures based upon times that gestures are performed, weather conditions when gestures are performed, and so forth.

In addition, the computing system 110 can be configured to identify a gesture set forth by the person 118 after the human has scheduled a ride with the autonomous vehicle 100 and can cancel the scheduled tide based upon the identified gesture. For example, the person 118 can schedule a ride through a conventional approach, wherein the person initiates a ride-sharing application on a mobile telephone of the person and schedules a ride with the autonomous vehicle 100. As the autonomous vehicle 100 approaches the person 118, however, the person 118 may choose to cancel the ride, and can indicate as much to the autonomous vehicle 100 by way of the gesture. In another example, the person 118 may initially hail the autonomous vehicle 100 by way of a first gesture, and subsequently cancel the autonomous vehicle by way of a second gesture. In still yet another example, the person 118 may be standing near the edge of the roadway and may not intend to hail the autonomous vehicle 100. The computing system 110, however, may cause the autonomous vehicle 100 to decrease its velocity and move in a direction of the person 118 (so that the computing system 110 can ascertain whether or not the person 118 is actually hailing the autonomous vehicle). When the person 118 perceives the autonomous vehicle 100 slowing down, the person 118 can set forth a gesture to the autonomous vehicle 100 that informs the autonomous vehicle that the person 118 is not requesting a ride.

In yet another example, the computing system 110 can recognize a gesture that imparts to the autonomous vehicle 100 that the person 118 is requesting one of a shared ride or a personal ride. This gesture can be a standalone gesture, wherein the person 118 indicates a desired destination location after the person 118 enters the autonomous vehicle 100. In another example, the computing system 110 can be configured to recognize a sequence of gestures (or put differently, the computing system 100 can recognize a gesture that includes a sequence of sub-gestures, with each sub-gesture having a travel characteristic assigned thereto). For example, the person 118 can perform a first gesture that indicates that the person 118 desires a personal ride and can also perform a second gesture that indicates the destination address of the person 118. The computing system 110 can recognize the first and second gestures and can infer that the person 118 desires a personal ride to the destination address.

While the examples set forth above have been provided in the context of an autonomous vehicle, it is to be understood that the technologies described herein are also well-suited for use in conventional taxis and ride-sharing vehicles (driven by humans). For instance, a vehicle driven by a human can include at least one of the sensor systems 106-108 and the computing system 110, and the computing system 110 can identify that the person 118 is requesting a ride and further identify the gesture being performed by the person 118. Thereafter, the computing system 110 can identify the travel characteristic (e.g., destination location) that is mapped to the gesture (and optionally further mapped to a context) and can transmit the travel characteristic to a navigation application being used by the driver of the vehicle.

Figures 2, 3:
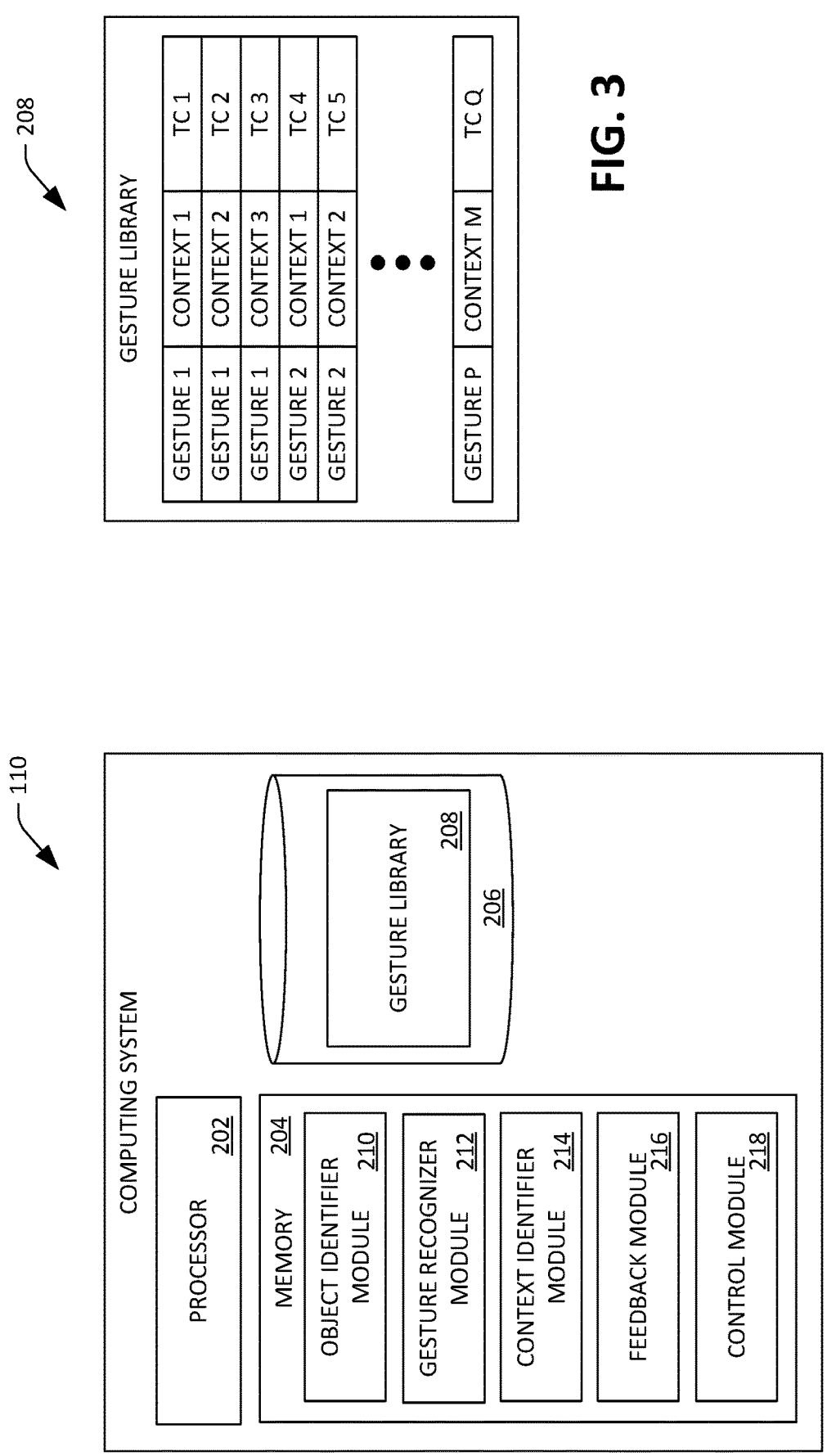
FIG. 2 is a functional block diagram of an exemplary computing system of an autonomous vehicle.
FIG. 3 is a schematic of a gesture library that is employed by an autonomous vehicle to ascertain a travel characteristic that is mapped to a gesture set forth by a potential passenger of the autonomous vehicle.

Now referring to FIG. 2, a functional block diagram of the computing system 110 is illustrated. The computing system 110 includes a processor 202, wherein the processor 202 can be a CPU, a GPU, a microprocessor, etc. The computing system 110 further includes a memory 204 that stores instructions that are executed by the processor 202. The computing system 110 additionally comprises a data store 206 that has a gesture library 208 retained therein.

Referring briefly to FIG. 3, the gesture library 208 is illustrated in more detail. The gesture library 208 includes mappings between combinations of gestures and contexts to travel characteristics (ICs) that are assigned to such combinations. Thus, for instance, a first travel characteristic is assigned to a combination of a first gesture and a first context, while a second travel characteristic is assigned to a combination of the first gesture and a second context, while a third travel characteristic is assigned to a combination of the first gesture and a third context. A context, as noted above, can include an identity of a person, a time of day, a day of week, a time of year, a geographic region, a weather condition, an event of interest (such as a baseball game), a place of interest, etc. Using these examples, then, the computing system 110 can identify a first travel characteristic when a first person performs the first gesture, and the computing system 110 can identify a second travel characteristic when a second person performs the first gesture. Similarly, the computing system 110 can identify a first travel characteristic when the first gesture is performed at a first time of day, and the computing system 110 can identify a second travel characteristic when the first gesture is performed at a second time of day. In addition, while not shown, the gesture library 208 can include a gesture that is mapped to a certain travel characteristic regardless of context.

Returning to FIG. 2, the memory 204 includes modules that are executed by the processor 202. Specifically, the memory 204 includes an object identifier module 210, a gesture recognizer module 212, a context identifier module 214, a feedback module 216, and a control module 218. The object identifier module 210 is configured to receive sensor signals output by the sensor systems 106-108 and identify objects represented in such sensor signals. The object identifier module 210 can include an artificial neural network (ANN), wherein the ANN is configured to receive features of at least one sensor signal and generate output that indicates whether objects of certain types are represented in the at least one sensor signal. Therefore, the object identifier module 210 can identify and track humans, bicycles, motorcycles, cars, trucks, traffic barrels, scooters, skateboards, etc. based upon the sensor signals output by the sensor systems 106-108.

The gesture recognizer module 212 is in communication with the object identifier module 210. When the object identifier module 210 detects that the person 118 is represented in a sensor signal, the object identifier module 210 outputs an indication to the gesture recognizer module 212 that the person 118 is represented in the sensor signal. The gesture recognizer module 212 receives such indication and is configured to: 1) ascertain whether the person 118 is performing a gesture that is intended to hail the autonomous vehicle 100; and 2) identify the gesture being performed by the person 118 from amongst a plurality of potential gestures. As described previously, the gesture recognizer module 210 can identify the gesture being performed by the person 118 based upon a sensor signal output by a sensor system of the autonomous vehicle and further optionally based upon contextual data (such as time of day, weather conditions, etc.), where the gesture recognizer module 212 can utilize the contextual data to disambiguate between gestures.

The gesture recognizer module 212 is in communication with the control module 218. When the gesture recognizer module 212 determines that the person 118 is performing a gesture that is intended to hail the autonomous vehicle, the gesture recognizer module 212 is configured to output an indication that the person 118 is attempting to hail the autonomous vehicle 100 to the control module 218. The control module 218, responsive to receiving such indication, can generate control signals that are transmitted to one or more of the propulsion system 112, the steering system 114, or the braking system 116. Specifically, the control module 218 is configured to output control signal(s) to the propulsion system 112, the steering system 114, and/or the braking system 116 to cause the autonomous vehicle 100 to decrease its velocity (in order to provide the gesture recognizer module 212 with additional time to identify the gesture being performed by the person 118 and/or to position a sensor system relative to the person 118 to improve the sensor system's view of the person 118). In addition, the control module 218 can control one or more of the sensor systems 106-108 to aid the gesture recognizer module 212 in identifying the gesture being performed by the person 118.

The gesture recognizer module 212 is additionally in communication with the control module 218. When the gesture recognizer module 212 determines that the person 118 is performing a gesture that is intended to hail the autonomous vehicle, the gesture recognizer module 212 is configured to output an indication that the person 118 is attempting to hail the autonomous vehicle 100 to the context identifier module 214. The context identifier module 214 is configured to identify a context associated with the gesture being performed by the person 118. The context can include time of day, day of week, time of year, weather conditions, temperature, geographic region, and the like. In addition, the context can include the identity of the person 118. The context identifier module 214 can ascertain the identity of the person 118 in a variety of manners, such as by way of facial recognition, retina scanning, voice recognition, posture analysis, analysis of various body characteristics of the person, through monitoring the location of the person 118 by way of a computer-executable application executing on a mobile telephone, etc. The context identifier module 214 can return the identified context to the gesture recognizer module 212 responsive to the context identifier module 214 identifying the context associated with the gesture being performed by the person 118. The gesture recognizer module 212, in response to identifying the gesture and receiving the context from the context identifier module 214, can query the gesture library 208 to identify a travel characteristic that is mapped to a combination of the gesture and the context.

The gesture recognizer module 212, responsive to identifying the travel characteristic, can provide the travel characteristic to the control module 218. The control module 218 controls operation of the propulsion system 112, the steering system 114, and/or the braking system 116 based upon the travel characteristic. For instance, the control module 218 can cause control signals to be transmitted to these mechanical systems such that the autonomous vehicle 100 pulls up next to the person 118 and picks up the person 118. Subsequently, the control module 218 can control the mechanical systems of the autonomous vehicle 100 to transport the person 118 in accordance with the identified travel characteristic.

The feedback module 216 is configured to solicit feedback from the person 118 and/or receive unsolicited feedback from the person 118 as to whether the gesture recognizer module 212 properly identified the gesture being performed by the person 118 and/or properly identified the travel characteristic that is mapped to the gesture in the gesture library 208.

Figure 4:
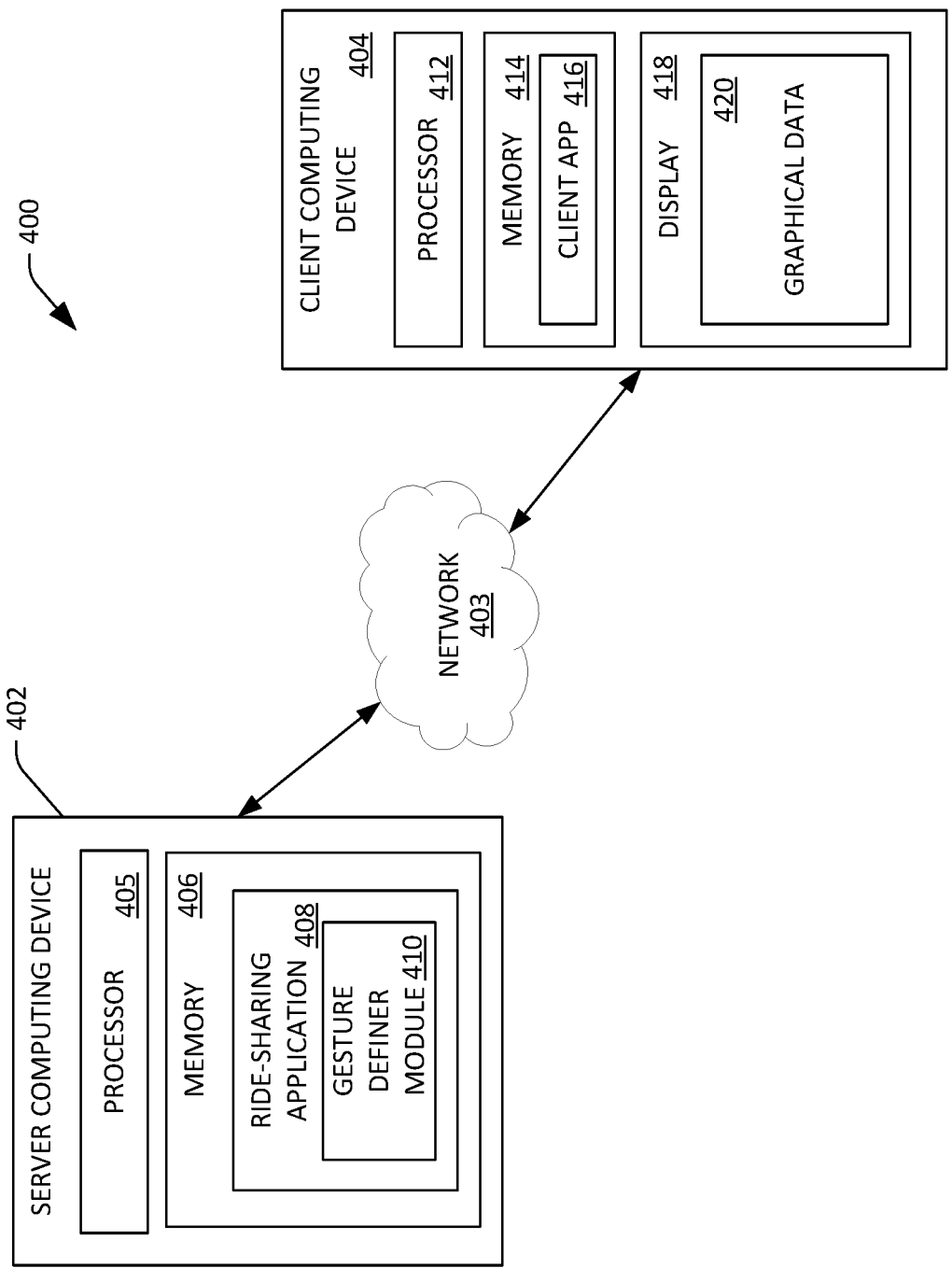
FIG. 4 is a functional block diagram of an exemplary system that is configured to assign travel characteristics to gestures of a person based upon input from the person.

With reference now to FIG. 4, an exemplary system 400 that is configured to assign travel characteristics to gestures (e.g., in the gesture library 208) is illustrated. The system 400 includes a server computing device 402 and a client computing device 404 that are in communication with one another by way of a network 403 (e.g. the Internet). The server computing device 402 includes a processor 405 and memory 406. The memory 406 includes a ride-sharing application 408, wherein the ride-sharing application 408 is generally configured to monitor locations of autonomous vehicles in a geographic region and is further configured to receive requests for rides in the autonomous vehicles by way of applications executing on client computing devices. For example, the client computing device 404 may have a mobile application installed thereon that is employable by a person using the client computing device 404 to indicate a desire for a ride with an autonomous vehicle. The ride-sharing application 408 can receive this request and match the request to an autonomous vehicle that is available to give the person a ride and is further geographically proximate to the person.

The ride-sharing application 408 further includes a gesture definer module 410. The gesture definer module 410 is configured to receive an identity of a gesture and further is configured to receive a travel characteristic that is to be mapped to the gesture for a particular person. In a nonlimiting example, the gesture definer module 410 can maintain a list of ten predefined gestures that are distinct from one another. Based upon input received from the particular person, the gesture definer module 410 can assign a travel characteristic to a gesture.

The client computing device 404 includes a processor 412 and memory 414, wherein the memory 414 has a client application 416 loaded therein. The client application 416 communicates with the ride-sharing application 408. The client computing device 404 further includes a display 418, which is configured to display graphical data 420 thereon. The graphical data 420 can include a graphical user interface (GUI) of the client application 416.

In an example, a user of the client computing device 404 can initiate the client application 416 and set forth input to the client application 416 that the user wishes to assign travel characteristics to gestures. Responsive to receiving such input, the client application 416 can retrieve the predefined list of gestures from the ride-sharing application 408 and can cause the predefined list of gestures to be displayed in the graphical data 420. The predefined list of gestures can be, for example, pictures of gestures, videos of gestures, or other data that identifies the gestures to the user of the client computing device 404. The user may select a gesture from the predefined list of gestures, which indicates to the client application 416 that the user wishes to assign a travel characteristic to such gesture. Subsequent to selecting the gesture, the user can assign a travel characteristic to the gesture. For instance, the user can set forth input to the client application 416 that the gesture is to be assigned a particular address. Responsive to receiving an indication that the user has assigned the travel characteristic to the gesture, the client application 416 can transmit the identity of user, the identity of the gesture, and the travel characteristic to the server computing device 402, whereupon it is received by the ride-sharing application 408. The ride-sharing application 408 can then store the identity of the gesture and the travel characteristic in a profile of the user, and can further store the identity of the gesture, the identity of the user, and the travel characteristic in the gesture library 208. Hence, when the user hails an autonomous vehicle by way of the gesture and the autonomous vehicle identifies the user, the autonomous vehicle can ascertain the travel characteristic that has been assigned to the gesture by the user. This process can be repeated for numerous gestures. In addition, the user can assign other contextual data to a gesture. For instance, the user can set forth input by way of the client application 416 that a selected gesture and a geographic region is to be mapped to a travel characteristic in the gesture library 208. For instance, when the autonomous vehicle 100 is in a first city, a gesture can be mapped to an address in the first city when the computing system 110 identifies the gesture and determines the identity of the person 118, while when the autonomous vehicle 100 is in a second city, the gesture can be mapped to an address in the second city when the computing system 110 identifies the gesture and determines the identity of the person 118 (e.g., a "home" gesture is mapped to an apartment in San Francisco when the person 118 is in San Francisco, while the "home" gesture is mapped to a home of the parents of the person 118 in South Carolina when the person 118 is visiting his or her parents in South Carolina).

Figure 5:
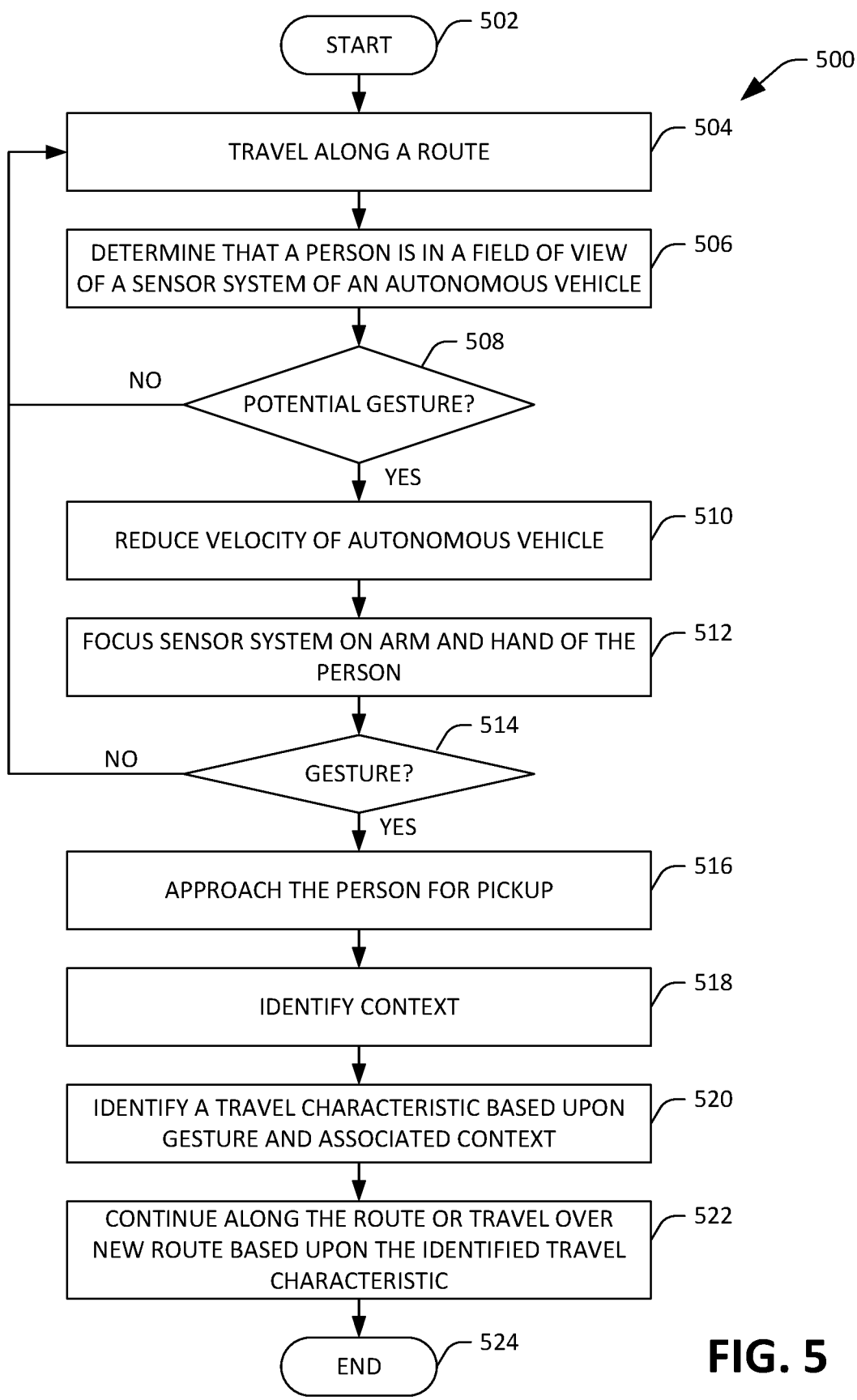
FIG. 5 is a flow diagram illustrating an exemplary methodology for controlling operation of an autonomous vehicle based upon identification of a gesture set forth by a potential passenger of the autonomous vehicle.
Figure 6:
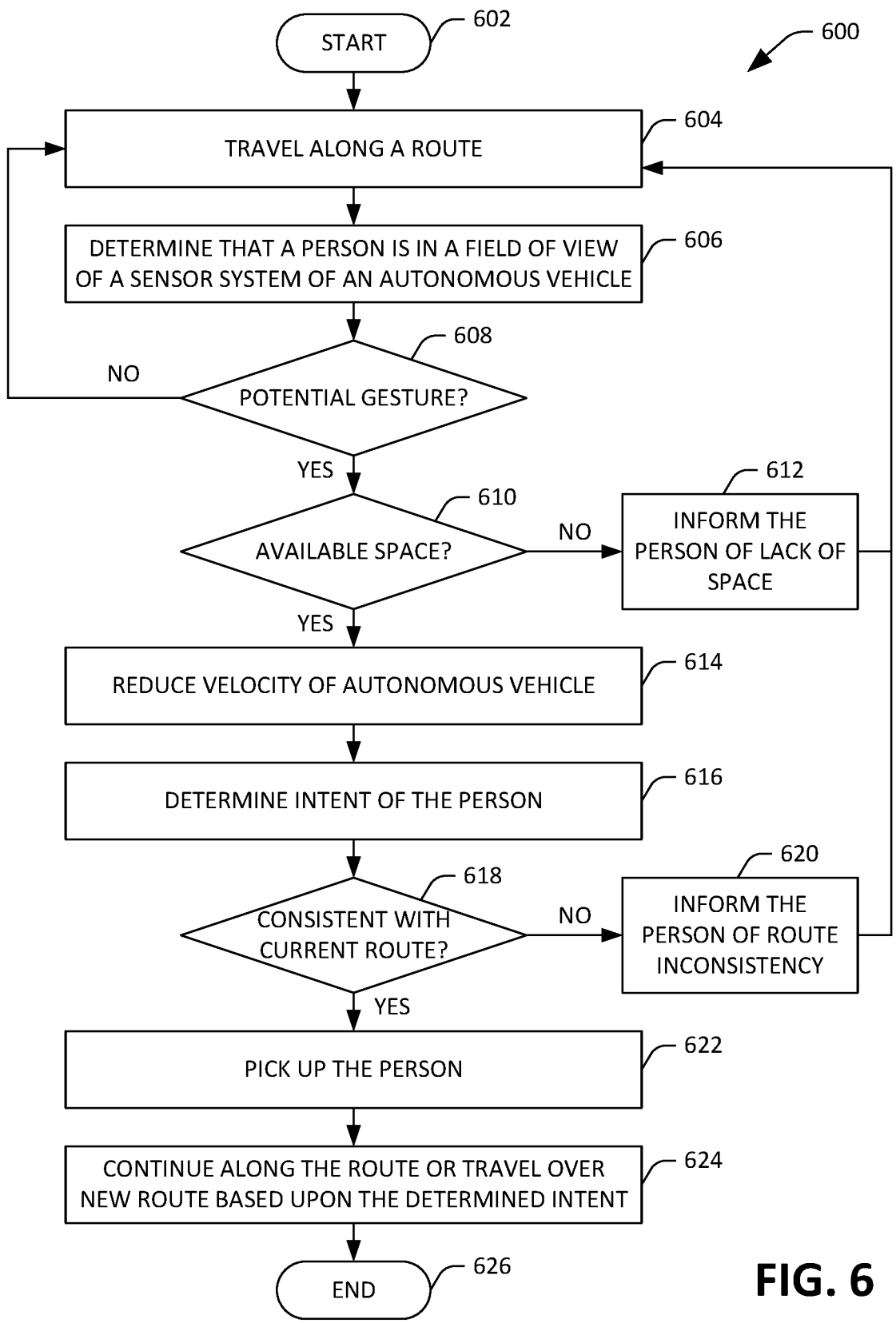
FIG. 6 is a flow diagram illustrating an exemplary methodology performed by an autonomous vehicle.

FIGS. 5 and 6 illustrate exemplary methodologies relating to identifying a travel characteristic of a ride in an autonomous vehicle based upon a gesture being performed by a person. While the methodologies are shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. As used herein, the term "computer-readable medium" does not encompass a propagated signal.

With reference now to FIG. 5, an exemplary methodology 500 performed by an autonomous vehicle is illustrated. The methodology 500 starts at 502, and at 504 the autonomous vehicle travels along a route. For instance, the autonomous vehicle can travel in a geographic region, searching for a person to pick up. The autonomous vehicle can be caused to travel in the geographic region based upon collective knowledge submitted by a fleet of autonomous vehicles, such that the autonomous vehicle is likely to have a person hail the autonomous vehicle when travelling in the geographic region. At 506, the autonomous vehicle determines that a person is in a field of view of a sensor system of the autonomous vehicle based upon a sensor signal output by the sensor system. At 508, a determination is made as to whether the person is potentially performing a gesture. This determination can be made as a function of positions of extremities of the person (as represented in a sensor signal), location of the person relative to an edge of the roadway, etc. If it is ascertained that the person is not performing a gesture to hail the autonomous vehicle, then the methodology returns to 504. If it is ascertained at 508 that the person is potentially performing a gesture to hail the autonomous vehicle, then at 510 the velocity of the autonomous vehicle is reduced, thereby providing the autonomous vehicle additional time to identify the gesture being performed by the person. At 512 a sensor system is focused on an arm and hand of the person. For instance, the sensor system may include an articulated sensor, which can be controlled to be focused towards the arm and the hand of the person. At 514, a determination is made as to whether the person is making a particular gesture to the autonomous vehicle such that the autonomous vehicle is to pick up the person. If it is determined at 514 that the person is not performing a gesture that is directed towards the autonomous vehicle, the methodology returns to 504. If at 514 it is determined that the person is performing a gesture, then at 516 the autonomous vehicle approaches the person to pick up the person.

At 518, as the autonomous vehicle continues to get closer to the person and/or as the autonomous vehicle is stopped next to the person, context associated with the gesture being performed by the person is identified. This context can include the identity of the person, a time of day, a geographic location, a weather condition, and so forth. At 520, a travel characteristic is identified based upon the gesture identified at 514 and the context identified at 518. As described above, the travel characteristic is mapped to a combination of the gesture and the context. At 522, the autonomous vehicle operates based upon the identified travel characteristic. For instance, when the autonomous vehicle is unable to accommodate the travel characteristic, the autonomous vehicle continue can continue along its route. Alternatively, when the autonomous vehicle is able to accommodate the travel characteristic, the autonomous vehicle can pick up the person and operate based upon the travel characteristic. Responsive to identifying the travel characteristic, the autonomous vehicle performs a driving maneuver based upon the characteristic, wherein the driving maneuver can be accelerating, decelerating, making a right turn, making a left turn, etc. The methodology 500 completes at 524.

With reference now to FIG. 6, a flow diagram illustrating an exemplary methodology 600 performed by an autonomous vehicle is illustrated. The methodology 600 starts at 602, and at 604 the autonomous vehicle travels along a route. At 606, the autonomous vehicle determines that a person is in a field of view of a sensor system of the autonomous vehicle, and at 608 a determination is made as to whether the person is potentially performing a gesture in an attempt to hail the autonomous vehicle. If it is ascertained at 608 that the person is not performing a gesture, then the methodology 600 returns to 604. If at 608 it is determined that the person may be performing a gesture to hail the autonomous vehicle, then the methodology 600 proceeds to 610, where a determination is made as to whether there is sufficient space in the autonomous vehicle to pick up the person. If it is determined at 610 that there is insufficient space to pick up the person, then the methodology 600 proceeds to 612, and the autonomous vehicle informs the person as to the lack of space in the autonomous vehicle. The autonomous vehicle can inform the person of the lack of space in a variety of ways, such as by controlling a sign on the autonomous vehicle, projecting text onto a roadway, transmitting a signal to a mobile telephone of the person, etc. After 612, the methodology 600 returns to 604.

If at 610 it is determined that there is available space to pick up the person, then at 614 the velocity of the autonomous vehicle is reduced, thereby giving the autonomous vehicle additional time to ascertain a travel intent of the person. At 616, the travel intent of the person is determined based upon the gesture performed by the person and optionally further based upon context associated with the gesture, such as identity of the person, time of day, day of week, and so forth.

At 618, a determination is made as to whether the travel intent of the person is consistent with the current route being taken by the autonomous vehicle. For instance, in a ride-sharing scenario, the autonomous vehicle may already have a passenger therein that is being taken to a particular destination. The travel intent of the person may be to be taken to a second destination that is out of the way of the destination of the passenger that is already in the autonomous vehicle. If at 618 it is determined that the travel intent of the person is not consistent with the current route being taken by the autonomous vehicle, then at 620 the autonomous vehicle informs the person as to the inconsistency of the travel intent of the person with respect to the current route being taken by the autonomous vehicle. Thereafter, the methodology 600 returns to 604. If at 618 it determined that the travel intent of the person is consistent with the current route being taken by the autonomous vehicle, then at 622 the autonomous vehicle picks up the person. At 624, the autonomous vehicle operates based upon the determined travel intent of the person. The methodology 600 completes at 626.

Figure 7:
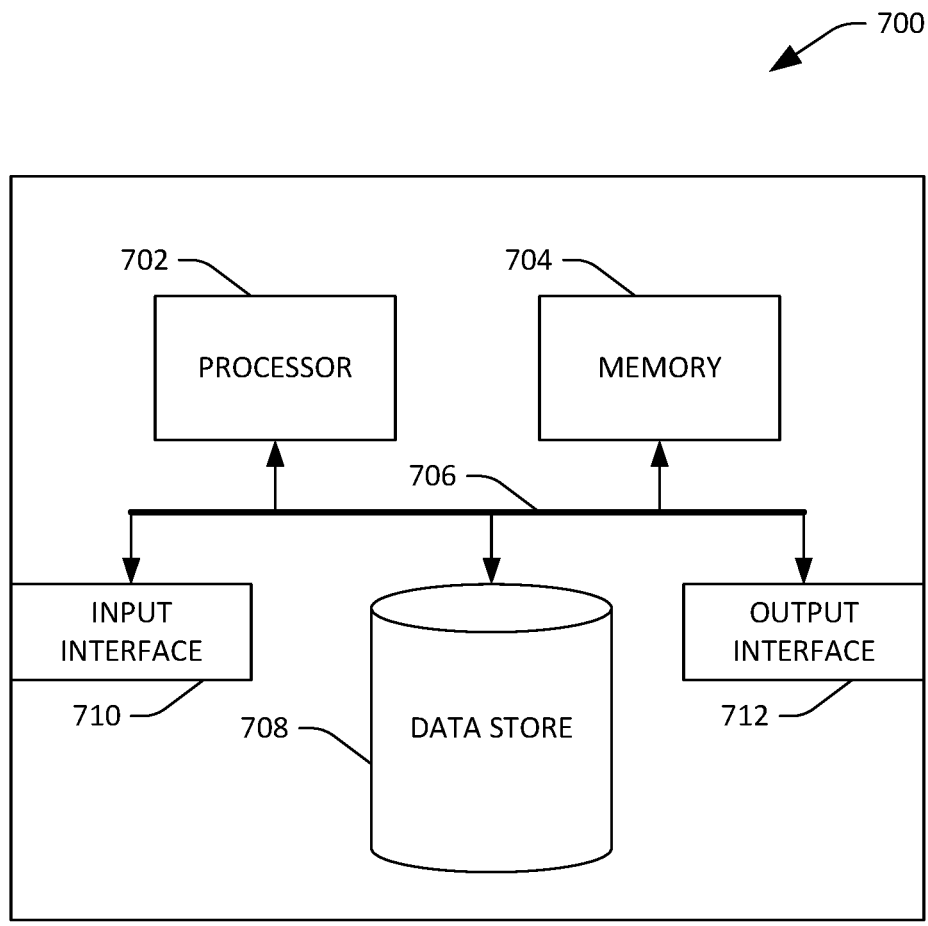
FIG. 7 is a schematic of an exemplary computing system.

Referring now to FIG. 7, a high-level illustration of an exemplary computing device 700 that can be used in accordance with the systems and methodologies disclosed herein is illustrated. For instance, the computing device 700 may be or include the computing system 110, the server computing device 402, or the client computing device 404. The computing device 700 includes at least one processor 702 that executes instructions that are stored in a memory 704. The instructions may be, for instance, instructions for implementing functionality described as being carried out by one or more modules and systems discussed above or instructions for implementing one or more of the methods described above. The processor 702 may be a GPU, a plurality of GPUs, a multi-core processor, etc. The processor 702 may access the memory 704 by way of a system bus 706. In addition to storing executable instructions, the memory 704 may also store gestures, contexts, travel characteristics, etc.

The computing device 700 additionally includes a data store 708 that is accessible by the processor 702 by way of the system bus 706. The data store 708 may include executable instructions, sensor data, a gesture library, etc. The computing device 700 also includes an input interface 710 that allows external devices to communicate with the computing device 700. For instance, the input interface 710 may be used to receive instructions from an external computer device, etc. The computing device 700 also includes an output interface 712 that interfaces the computing device 700 with one or more external devices. For example, the computing device 700 may transmit control signals to the propulsion system 112, the steering system 114, and/or the braking system 116 by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc ((D), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs), etc.

What has Teen described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle comprising:
   a sensor system that is configured to generate a sensor signal, wherein the sensor signal indicates that a person is at a location that is external to the autonomous vehicle;
   a computing system that is in communication with the sensor system and receives the sensor signal generated by the sensor system, wherein the computing system comprises:
   a processor; and
   memory storing instructions that, when executed by the processor, cause the processor to perform acts comprising:
      responsive to receiving the sensor signal and based upon the sensor signal, identifying a contactless gesture that is being performed by the person, wherein the contactless gesture indicates:
         that the person is requesting a ride from the autonomous vehicle; and
         a desired destination of the person who is requesting the ride from the autonomous vehicle, wherein the contactless gesture is identified from amongst a plurality of predefined contactless gestures;
      identifying the desired destination of the person based upon:
         the contactless gesture; and
         an identity of the person who is performing the contactless gesture, wherein a combination of the contactless gesture and the identity of the person is mapped to the desired destination in a gesture library, and further wherein the autonomous vehicle is to transport the person along a route that begins at the location and ends at the desired destination upon the person entering the autonomous vehicle; and
      subsequent to identifying the desired destination, controlling operation of the autonomous vehicle based upon the desired destination.

2. The autonomous vehicle of claim 1, the acts further comprising:
   prior to identifying the contactless gesture, detecting that the person is at the location that is external to the autonomous vehicle based upon the sensor signal; and
   responsive to detecting that the person is at the location that is external to the autonomous vehicle, controlling at least one of a propulsion system or a braking system of the autonomous vehicle to decrease velocity of the autonomous vehicle, wherein the contactless gesture is identified subsequent to the velocity of the autonomous vehicle being decreased.

3. The autonomous vehicle of claim 2, the acts further comprising:

responsive to detecting that the person is at the location that is external to the autonomous vehicle, controlling the sensor system to focus the sensor system on a hand of the person; and identifying the contactless gesture that is being performed by the person responsive to controlling the sensor system to focus the sensor system on the hand of the person.

4. The autonomous vehicle of claim 1, the acts further comprising:

identifying contextual data, wherein the travel characteristic is identified based upon the contextual data.

5. The autonomous vehicle of claim 4, wherein identifying the contextual data comprises determining the identity of the person.

6. The autonomous vehicle of claim 5, wherein the autonomous vehicle comprises a second sensor system that is configured to generate a second sensor signal, wherein the second sensor signal comprises data that is indicative of physical features of the person, and further wherein the identity of the person is determined based upon the second sensor signal.

7. The autonomous vehicle of claim 5, wherein the autonomous vehicle is in network communication with a server computing device, and further wherein determining the identity of the person comprises receiving data from the server computing device that indicates that a mobile telephone assigned to the person is at the location.

8. The autonomous vehicle of claim 4, wherein the contextual data is one of time of day, day of week, time of year, geographic location, weather condition, or a known event of interest.

9. The autonomous vehicle of claim 1, the acts further comprising:

comparing the desired destination with a current route of the autonomous vehicle; and based upon the comparing of the desired destination with the current route of the autonomous vehicle, determining that the desired destination is not along the current route, wherein controlling the operation of the autonomous vehicle comprises causing the autonomous vehicle to inform the person that the desired destination is not along the current route of the autonomous vehicle.

10. The autonomous vehicle of claim 1, the acts further comprising:

computing a travel route between the location and the desired destination, wherein controlling the operation of the autonomous vehicle comprises causing the autonomous vehicle to navigate the travel route between the location and the desired destination once the person is inside the autonomous vehicle.

11. The autonomous vehicle of claim 1, wherein the autonomous vehicle is in motion when the contactless gesture is identified.

12. The autonomous vehicle of claim 1, the acts further comprising:

detecting a second contactless gesture set forth by the person; and determining a number of people including the person who intend to enter the autonomous vehicle at the location based upon the second contactless gesture.

13. The autonomous vehicle of claim 1, wherein the desired destination is a home address of the person as indicated in the gesture library.

14. A method performed by an autonomous vehicle while the autonomous vehicle is in motion, the method comprising:

generating, by a sensor system of the autonomous vehicle, a first sensor signal that is indicative of surroundings of the autonomous vehicle;

detecting, by a processor of a computing system of the autonomous vehicle and based upon the first sensor signal, that a person is represented in the first sensor signal;

subsequent to detecting that the person is represented in the first sensor signal, identifying, by the processor and based upon the first sensor signal, a contactless gesture being performed by the person from amongst a plurality of predefined contactless gestures;

generating, by a second sensor system of the autonomous vehicle, a second sensor signal, wherein the second sensor signal comprises data that is indicative of features of a face of the person;

subsequent to detecting that the person is represented in the first sensor signal, recognizing an identity of the person based upon the data that is indicative of the features of the face of the person;

responsive to identifying the contact less gesture, identifying, by the processor:

that the person is requesting a ride from the autonomous vehicle; and a desired destination, wherein the desired destination is identified based upon both the identity of the person and the contactless gesture that was identified from amongst the plurality of predefined contactless gestures, and further wherein the autonomous vehicle is to transport the person along a route that ends at the desired destination; and responsive to identifying the desired destination and based upon the desired destination, performing a driving maneuver.

15. The method of claim 14, further comprising:

responsive to detecting that the person is represented in the first sensor signal, reducing a velocity of the autonomous vehicle, wherein the contactless gesture from amongst the plurality of contact less gestures is identified subsequent to the velocity of the autonomous vehicle being reduced.

16. The method of claim 14, further comprising:

determining, by the processor, a geographic region in which the autonomous vehicle is travelling, wherein the desired destination is mapped to a combination of the identity of the person, the geographic region, and the contactless gesture.

17. The method of claim 14, further comprising:

responsive to identifying the desired destination and prior to performing the driving maneuver, computing, by the processor, a route between a current location of the autonomous vehicle and the desired destination, wherein the driving maneuver is performed by the autonomous vehicle when travelling the route.

18. An autonomous vehicle comprising:

a propulsion system;

a sensor system; and a computing system that is in communication with the propulsion system and the sensor system, wherein the computing system is programmed to perform acts comprising:

based upon a sensor signal received from the sensor system, identifying that a person is gesturing to request a ride from the autonomous vehicle;

responsive to identifying that the person is gesturing to request the ride, controlling the propulsion system such that velocity of the autonomous vehicle is decreased;

while the velocity of the autonomous vehicle is decreased and while the autonomous vehicle is still in motion, identifying, based upon the sensor signal, a contactless gesture being made by the person from amongst a plurality of predefined contactless gestures;

determining an identity of the person who is gesturing to request the ride;

responsive to identifying the contactless gesture and the identity of the person being determined, identifying a desired destination for the person, wherein the desired destination is identified from a computer-readable gesture library based upon both the contactless gesture and the identity of the person;

computing a route between a current location of the autonomous vehicle and the desired destination, wherein the autonomous vehicle is to transport the person along a route that ends at the desired destination upon the person entering the autonomous vehicle; and subsequent the person entering the autonomous vehicle, controlling the propulsion system while the autonomous vehicle navigates the route to the desired destination.

19. The autonomous vehicle of claim 18, wherein determining the identity of the person comprises:

extracting facial features of the person from a second sensor signal output by a second sensor system of the autonomous vehicle, wherein the identity of the person is determined based upon the facial features extracted from the second sensor signal.

20. The autonomous vehicle of claim 18, wherein determining the identity of the person comprises receiving the identity of the person over a short-range communication protocol from a client computing device of the person.

* * * * *